Jan. 26, 1926.

L. G. NELSON 1,571,061

FOOD COVER

Filed April 23, 1923  2 Sheets-Sheet 1

Inventor:
Leigh G. Nelson,
By Dyrenforth, Lee, Chritton & Wiles,
Attys.

Jan. 26, 1926.

L. G. NELSON

FOOD COVER

Filed April 23, 1923

1,571,061

2 Sheets-Sheet 2

Inventor;
Leigh G. Nelson,

Patented Jan. 26, 1926.

1,571,061

UNITED STATES PATENT OFFICE.

LEIGH G. NELSON, OF CHICAGO, ILLINOIS.

FOOD COVER.

Application filed April 23, 1923. Serial No. 633,958.

*To all whom it may concern:*

Be it known that LEIGH G. NELSON, a citizen of the United States, residing at Chicago, in the county of Cook and State of Illinois, has invented a new and useful Food Cover, of which the following is a specification.

This invention relates to improvements in food covers.

My improved food cover is light and durable, neat in appearance, and easy to manufacture.

It may be made in a great variety of shapes and forms adapted for many different uses.

Other features and advantages of my improved food cover will more fully be described as I proceed with my specifications.

Figure 1:
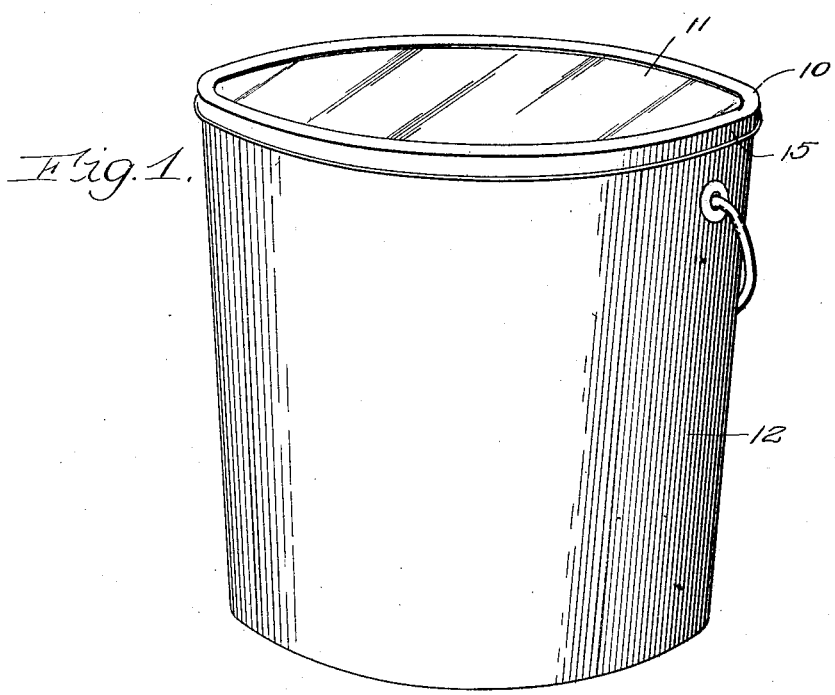
Figure 2:
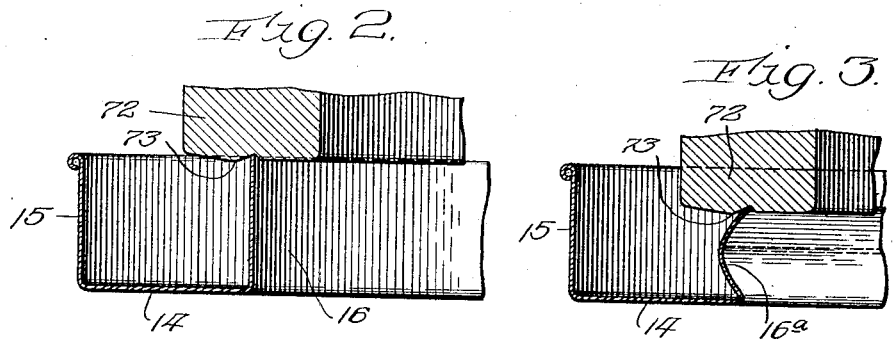
Figure 3:
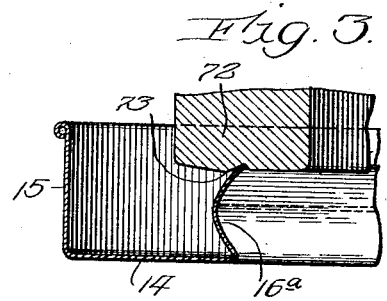
Figure 4:
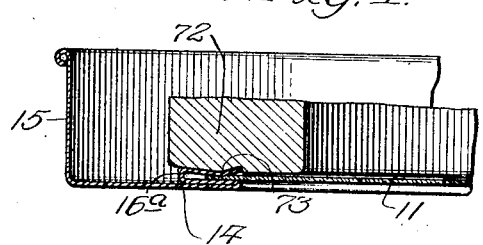
Figure 5:
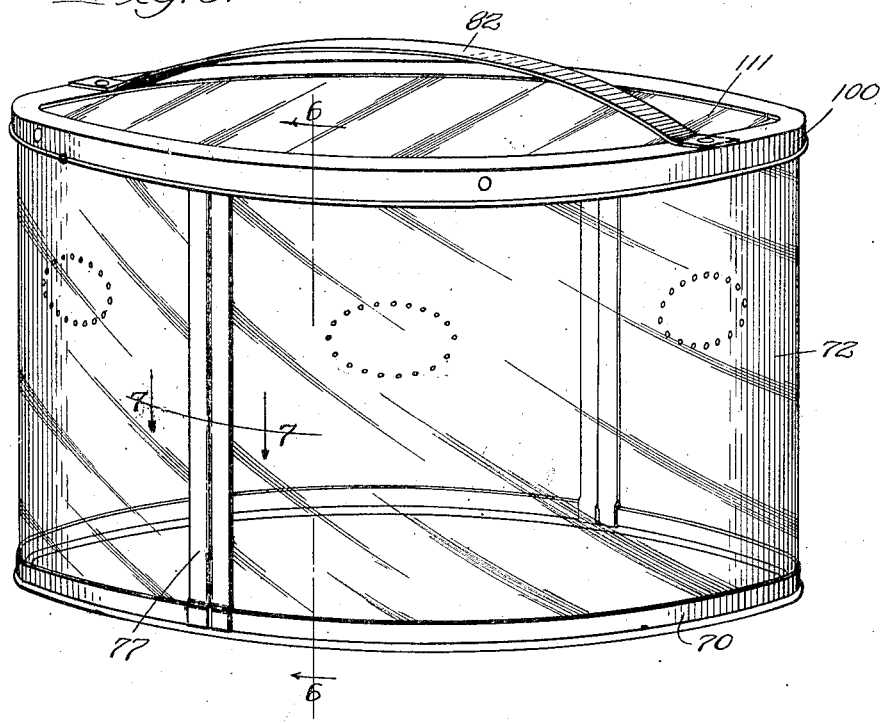
Figure 6:
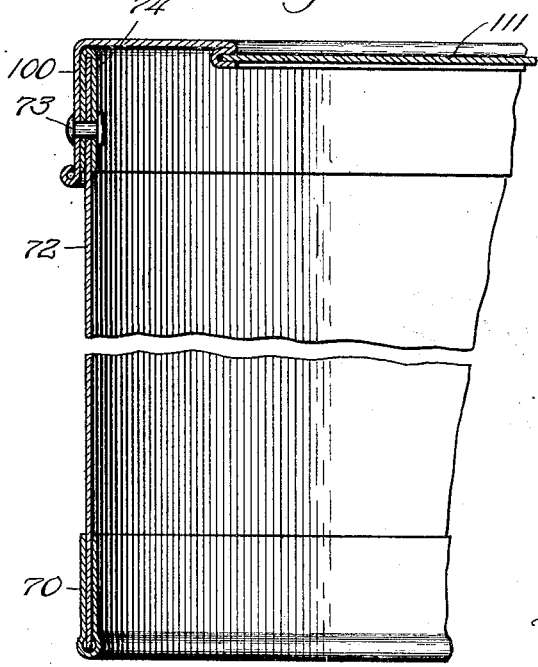
Figure 7:

In that form of device embodying the feature of my invention, shown in the accompanying drawings, Figure 1, is a view in perspective of a pail covered with one of my improved food covers. Fig. 2, is a vertical sectional view taken through the rim of said cover illustrating one of the steps in the process of manufacture. Fig. 3, is a similar view illustrating another step in the process of manufacture. Fig. 4 is a similar view showing the complete product. Fig. 5 is a view in perspective of a different form of food cover. Fig. 6, is a view taken as indicated by line 6 of Fig. 5. Fig. 7, is a view taken as indicated by line 7 of Fig. 5.

The device shown in Fig. 1, comprises primarily, a metal flanged ring supporting a circular disc of flexible transparent material such as celluloid 11. The complete cover is adapted to be placed over a pail containing food or other material, such as indicated by 12.

I will now describe the construction of the ring 10, and show the manner of supporting the celluloid disc 11.

A ring made of sheet material is first formed in the shape shown in Fig. 2. The ring is here shown inverted. It will be noted that in the cross section, the ring has a substantially flat portion 14, with an upwardly turned flange 15, at its outer edge, and another upwardly turned flange 16, at its inner edge.

In the first step of manufacture, a downward pressure is brought to bear on the upper edge of flange 16 by means of a suitable die 72 in order to give this flange a slight bend, as indicated by 16ª in Fig. 3.

The circular disc of celluloid 11, is then inserted in this bend, and full downward pressure is brought to bear on the upper edge of flange 16, with the result that it is tightly crimped or folded down, as shown in Fig. 4; thus securely clamping and gripping the celluloid 11, along its edge.

It is to be noted that the die 72, is provided with a slightly projecting edge 73, so that the flange 16 will not be bent so sharply at 16ª so as to weaken it or cause it to break. The projection 73, however, forms a slight creasing in the flange 16, which serves to clamp the edge of the celluloid 11.

The cover shown in Fig. 5 is adapted for use on a flat board or table. This food cover comprises a ring 100, made substantially the same as the ring 10 of the device shown in Fig. 1. The ring 100, supports a celluloid disc 111.

In the device shown in Fig. 5, there is also provided another ring 70, of the same size as the ring 100, and arranged below it. Between the two rings 70 and 100, there are arranged two semi-cylindrical sheets of celluloid 72. The upper edges of the celluloid sheets 72, are joined to the ring 100, by means of rivets 73, and these upper edges are re-inforced by a metal strip 74, as shown.

The meeting edges of the sheets of celluloid 72, are joined by strips 77, shown in cross section in Fig. 7. These strips are bent and crimped as shown, in order to clamp the edges of the sheets 72. These strips 77, are also suitably joined at their upper ends to the ring 100, and at their lower ends, to ring 70, and these serve as stiffening and supporting members.

The device in Fig. 5, is also provided with a bowed handle 82, riveted at its ends at diametrically opposite points on the ring 100.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new and desire to secure by Letters Patent, is:

A device of the character described, comprising a ring having a substantially flat portion with a downwardly turned flange at its outer edge, and a downwardly projecting crimped flange at the inner edge supporting a circular disk of transparent material, the bend in said crimped flange being relatively large and springy and its extreme inner edge being bent downward away from said transparent material, whereby said transparent material is clamped in said crimped flange.

In witness whereof I have hereunto set my hand and seal this 19th day of April, 1923.

LEIGH G. NELSON. [L. S.]